United States Patent
Wallash et al.

[11] Patent Number: 5,661,614
[45] Date of Patent: Aug. 26, 1997

[54] METHOD AND APPARATUS FOR ERROR RECOVERY FOR UNSTABLE MAGNETORESTRICTIVE HEADS

[75] Inventors: Albert John Wallash, Morgan Hill; Robert Eugene Eaton; Richard George Hirko, both of San Jose, all of Calif.

[73] Assignee: International Business Machines Corporation, Armonk, N.Y.

[21] Appl. No.: 384,309

[22] Filed: Feb. 6, 1995

Related U.S. Application Data

[63] Continuation of Ser. No. 252,616, May 31, 1994, abandoned.

[51] Int. Cl.$^6$ ............................................. G11B 5/03
[52] U.S. Cl. ............................................. 360/66; 360/113
[58] Field of Search ........................... 360/27, 31, 53, 360/66, 77.06, 113; 324/76.83, 522, 537; 338/32 R

[56] References Cited

U.S. PATENT DOCUMENTS

| | | | |
|---|---|---|---|
| 3,979,775 | 9/1976 | Schwarz | 360/113 |
| 4,075,671 | 2/1978 | Cheatham et al. | 360/27 X |
| 4,447,781 | 5/1984 | VAn Dyke | 324/76.83 |
| 4,516,165 | 5/1985 | Cunningham et al. | 360/53 |
| 4,821,125 | 4/1989 | Christensen et al. | 360/31 |
| 5,189,566 | 2/1993 | Christensen et al. | 360/53 |
| 5,255,442 | 10/1993 | Schierbeek et al. | 33/361 |
| 5,390,054 | 2/1995 | Youngquist et al. | 360/66 |
| 5,436,773 | 7/1995 | Hanson | 360/66 |
| 5,461,517 | 10/1995 | Suda et al. | 360/53 |

OTHER PUBLICATIONS

K. Morikawa, T. Matsuura, S. Horibata, H. Shibata, "A Study of Popcorn Noise for Thin Film Heads", 1991, pp. 4939–4941, IEEE Transactions on Magnetics, vol. 27, No. 6, Nov. 1991.

*Primary Examiner*—Aristotelis M. Psitos
*Assistant Examiner*—Patrick Wamsley
*Attorney, Agent, or Firm*—Benman Collins & Sawyer; Leslie G. Murrray

[57] ABSTRACT

A method and apparatus is disclosed for recovering data with unstable low amplitude magnetorestrictive heads. After an error in data recovery is detected a technique is invoked that changes the bias current through the magnetoresistive head to the reverse direction in a predetermined manner. The method includes reversing the bias current direction, returning the bias current to its normal state and reading the data from the storage medium. Alternatively, the method includes reversing the bias current direction and reading the data when the bias current direction is reversed.

1 Claim, 5 Drawing Sheets

Peak to Peak Amplitude = 155 µV at +12 mA

Peak to Peak Amplitude = 218 µV at +12 mA after 12 mA 102 mV 312 mV 940 mV

METHOD AND APPARATUS FOR ERROR RECOVERY FOR UNSTABLE MAGNETORESTRICTIVE HEADS

This application is a continuation of application Ser. No. 08/252,616, now abandoned, filed on May 31, 1994.

FIELD OF THE INVENTION

The present invention relates to magnetic read-write storage devices and more particularly to a method for recovering data from a disk.

DESCRIPTION OF THE RELATED ART

Basically, rotating memory includes at least one disk and/or a tape drive capable of storing magnetic data. A transducer that includes a gap typically is flown over the surface of the magnetic disk. Current is passed through coils in the transducer to produce magnetic lines of flux at the gap of the transducer which in turn magnetizes portions of the disk surface. An actuator arm includes the transducer and is used to move the transducer to various positions over the surface of the disk.

The transducer is also used to sense the magnetized portions of the disk. This is commonly called reading the data from the disk. The actuator arm moves the transducer to a selected area of interest that contains data needed for a particular computation by a computer. The magnetized portion of the disk produces flux lines or a magnetic field near the surface of the disk. In an inductive head, as the transducer is flown or passed near the surface of a spinning disk, a voltage is induced within the coils of the transducer by the changing magnetic field generated by the rotating disk. This voltage is used to detect transitions in the magnetic field on the surface of the disk. These transitions represent the data stored on the disk.

Previously both the reading and the writing functions were accomplished using one inductive head. Typically, these prior art merged inductive read/write heads required significant tradeoffs that prevented optimization of such heads. Hence, it became important to separate the recording of data from the writing of data.

With this separation of the reading and writing function, a new type of transducer, called a magnetoresistive (MR) head was developed by International Business Machines Corporation (IBM) to allow for improved reading of data from the disk. An MR head is made of a material such as permalloy (NiFe) which exhibits a variable resistance to current flow as a function of an applied magnetic field.

In such a head, data are read from the disk through a measurement of the variation of the resistance related to the magnetic field generated. It is known that an MR head can read data that is more densely packed than the prior art inductive head, hence the MR head has significant advantages over the traditional inductive head for reading data from a disk.

However, it has been found that some MR heads exhibit severe amplitude instability such that data cannot be properly read from the disk. In this instance, an error is detected which in turn triggers some corrective action. An error detected while the data is being read from the disk is commonly referred to as a read error. A soft read error is an error that is possible to correct. In many instances, the correction of the read error is handled without interrupting the computer system which is beyond the rotating disk storage device. The soft read error would also be corrected before the user becomes aware of a soft read error.

In all instances, when a read error is encountered, a multistep procedure is attempted called a data recovery procedure. When the steps in the data recovery procedure are unable to correct a read error, then the read error is termed a hard error.

Hard errors mean data have been lost. Once data are read with a high error rate or lost from a particular portion of a disk such as a sector, the area is reallocated to another spare magnetizable portion on the disk drive. During the process of reallocation, some errors may be recovered. Other hard errors may be ultimately recoverable but only after returning the disk drive to the factory. This procedure is time consuming for the people or the system relying on a disk drive and is also expensive for the manufacturer of the disk drive. Thus, sending a disk drive back to the factory to recover errors is usually done only in the rare instance when large amounts of important data are lost. Since read errors are undesirable, there always is a need for any step, process or apparatus which enhances a disk storage device's ability to recover any read errors without allowing them to become hard. Any enhancement in the ability to recover read errors means that the rate of occurrence of hard errors will be reduced which in turn minimizes any loss of data and inconvenience for customers relying on the disk drive, and expensive data recovery at the factory.

In the past, various steps have been used to recover data with data recovery procedures. U.S. Pat. No. 4,821,125 issued to Christensen et al. discloses a data recovery procedure at column 8, line 32 and following. The data recovery procedure is also depicted in FIG. 6 of that patent in flow chart form. Basically, the Christensen et al. patent teaches rereading the portion of the disk containing the error several times and then changing a channel characteristic and then again rereading the portion of the disk several times in an attempt to recover data which is in error. The disk is first reread without error correction code. After this certain channel characteristics are changed. The portion of the disk is reread with error correction code, then the head is offset from the track both inwardly and outwardly, then a reread is attempted after changing the variable delta-V detection parameter, and then a second error correction code is used during a reread. The Christensen et al. patent discloses one particular error recovery procedure and the specific step of changing the variable delta-V to recover errors.

There are many different error recovery procedures that feature all sorts of steps other than those shown in Christensen et al. patent. Other steps that are known in the art of data recovery include electronically varying the timing window used to detect transitions. The timing window can be shifted forward or backward from its on center position to detect transitions which occur either slightly ahead or slightly behind the time which they are supposed to occur in the window.

Another data recovery procedure for recovering read errors is disclosed in U.S. Pat. No. 4,516,165 issued to Cunningham et al. and entitled "Error Recovery Procedure Using Selective Erasure." The Cunningham et al. patent discloses reading and storing the data on the two adjacent tracks on either side of the track containing the error. The adjacent tracks are then each erased and the track containing the error is reread in an attempt to recover the error. This technique allows recovery of data from a track which exhibits consistent errors either because the track was partially obscure by adjoining tracks through writing over a portion of the track of interest due to track misregistration or the data on adjoining tracks was phase-shifted and of such a frequency that the lateral readback amplitudes were excessive.

Another technique for data recovery is disclosed in U.S. Pat. No. 5,189,566 issued to Christensen, et al., and entitled "Method and Apparatus for Recovery of Data". This technique enhances the ability of a disk drive to recover data and is conducted on a portion of the disk surface which is not being used to save information. In other words, an area which can be written on without the fear of losing data, servo or other information vital to the operation of the disk drive. Placing reserve sectors in a disk drive is common. Spare sectors are provided as a backup in the event a sector or sectors are determined to be magnetically defective. Generally, each cylinder is provided with a number of spares. In normal operation, if a sector is determined to be defective data is written into the spare sector rather than in the flagged sector.

Although all of these data recovery methods are useful for certain applications, they are not effective when an MR head exhibits severe amplitude instability. In particular, the MR head with severe amplitude instability and in a low amplitude state, will be unable to read back the data that is written on the disk even after utilizing such techniques. It has been found, for example, that some heads have a low amplitude state that results in a data signal 30-95% less than that output by an MR head in the normal, high amplitude state. Furthermore, experiments show that an MR head can stick or remain in a low amplitude state for long periods of time. The reduced signal amplitude results in a low signal to noise ratio producing read-errors. Typically, the low amplitude state is not permanent. The MR head may be returned to a high amplitude state by application of an appropriate stimulus.

Accordingly what is needed is a data recovery technique that quickly changes an MR head in a low amplitude state back to a high amplitude state. The technique should be simple, inexpensive and easy to implement in existing disk drives. The present invention addresses such a need.

SUMMARY OF THE INVENTION

A system is disclosed for recovering data in a magnetic storage device including a magnetic media for data storage.

In one aspect, the system comprises a current generating means for providing a bias current to an MR head to allow the reading of the data from the magnetic medium, reversal means coupled to the current generator for reversing the direction of the bias current through the MR head, and control means coupled to the reversal means for controlling the reversal means to increase the amplitude of the MR head output signal representing data read from the medium.

In another aspect, the system includes means coupled to the current generating means for reversing the direction of the bias current for a predetermined time period, means coupled to the reversing means for returning the bias current to a normal state, and means for reading the data from the storage medium.

In yet another aspect, a method is disclosed for recovering data in a magnetic storage device which has a magnetic medium for data storage which comprises the steps of providing a bias current to an MR head to allow the reading of the data from the medium, reversing the direction of the bias current through the MR head, and controlling the bias current and the reverse direction of the bias current to increase the amplitude of the MR head output signal representing data read from the medium.

By reversing the bias current it has been found that, low amplitude MR heads can be changed back to high amplitude, stable heads. Through this procedure data can be read from media that were formerly unreadable.

DESCRIPTION OF THE INVENTION

The present invention is directed to an improvement in data recovery in a magnetic storage device. The following description is presented to enable one of ordinary skill in the art to make and use the invention and is provided in the context of a patent application and its requirements. Various modifications to the preferred embodiment will be readily apparent to those skilled in the art and the generic principles defined herein may be applied to other embodiments. Thus, the present invention is not intended to be limited to the embodiment shown but is to be accorded the widest scope consistent with the principles and features described herein.

A magnetoresistive (MR) read head with magnetic instability can have a high number of soft or even hard errors in a magnetic storage system. In particular, an MR head with severe amplitude instability can, when in a low amplitude state, be unable to read back the data that is written on the disk. Some MR heads have been found to have a low amplitude state that results in an output signal having 30% to 95% less amplitude. If such a head were to pass initial testing in the normal amplitude state, and change to the low amplitude state at a later time, hard errors would result. Microtrack profiles of unstable heads show that these reduced amplitude states are caused by magnetic domains in the MR head. These domains appear to be induced in some heads by write head excitation current or landing on the disk.

An error recovery procedure such as disclosed in U.S. Pat. No. 5,189,566 is typically invoked by the microcode when a soft error is encountered. This procedure can involve multiple re-reading of the data at higher and lower MR bias currents, and also going off-track. The problem is that an MR head in the low amplitude state is largely unaffected by such measures, and the error recovery procedures could fail and produce a hard error.

The present invention takes advantage of the bias current within a typical disk drive assembly to provide a system for recovering data from low amplitude heads. As is well known, a bias current is required in the MR head to provide the signal required to read data from the media. Applicant has discovered a technique comprising reversal of the bias current direction in the MR head that causes unstable, low amplitude MR heads to be restored to a high amplitude state. Furthermore, stable heads are unaffected by the reversal of the bias current.

Figure 1A:
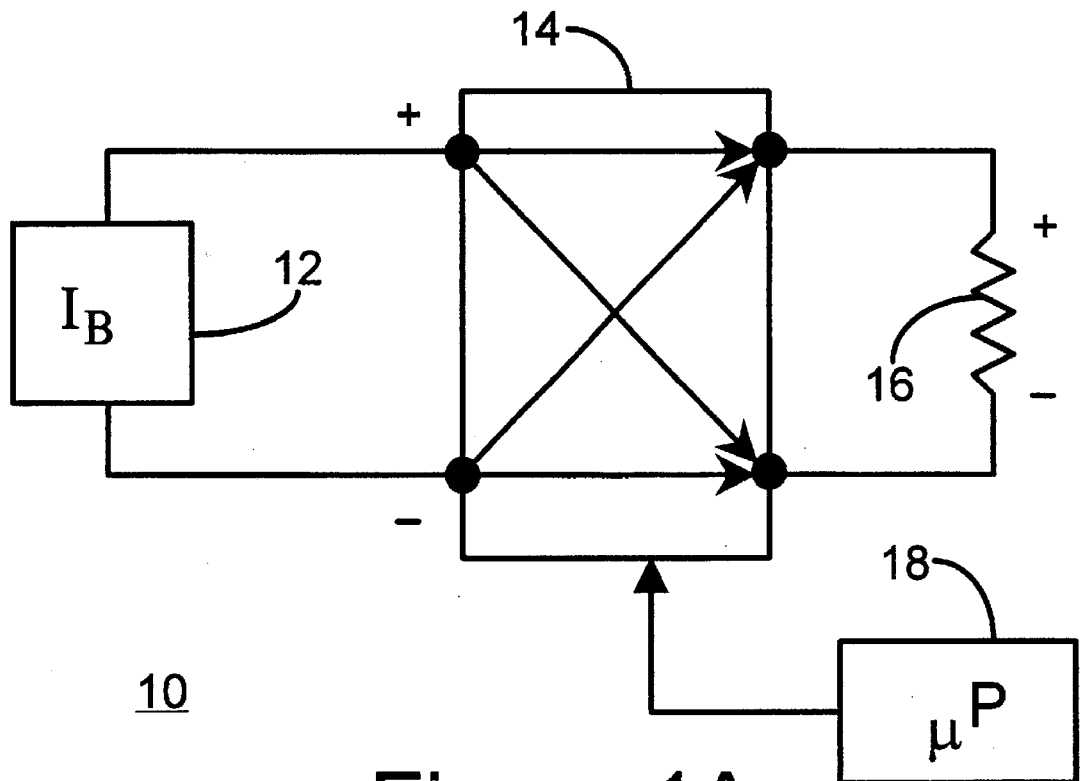
FIGS. 1a and 1b are simple block diagrams of a system in accordance with the present invention.
Figure 1B:
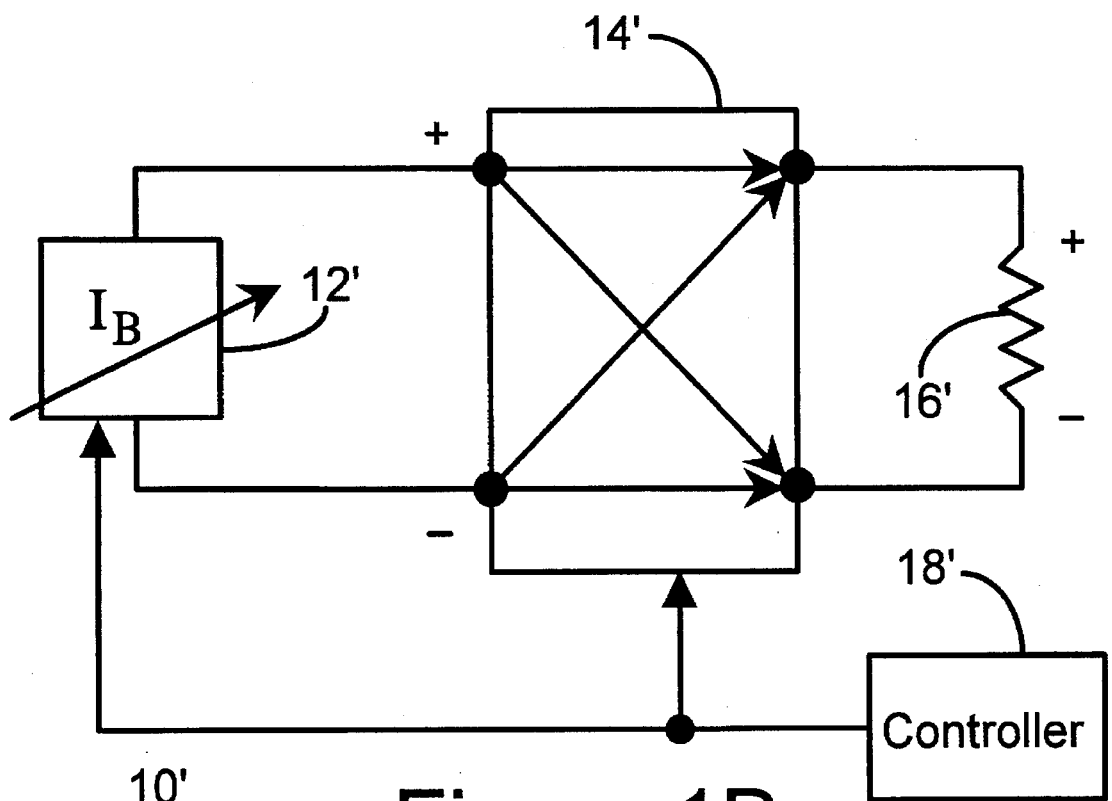
Figure 2:
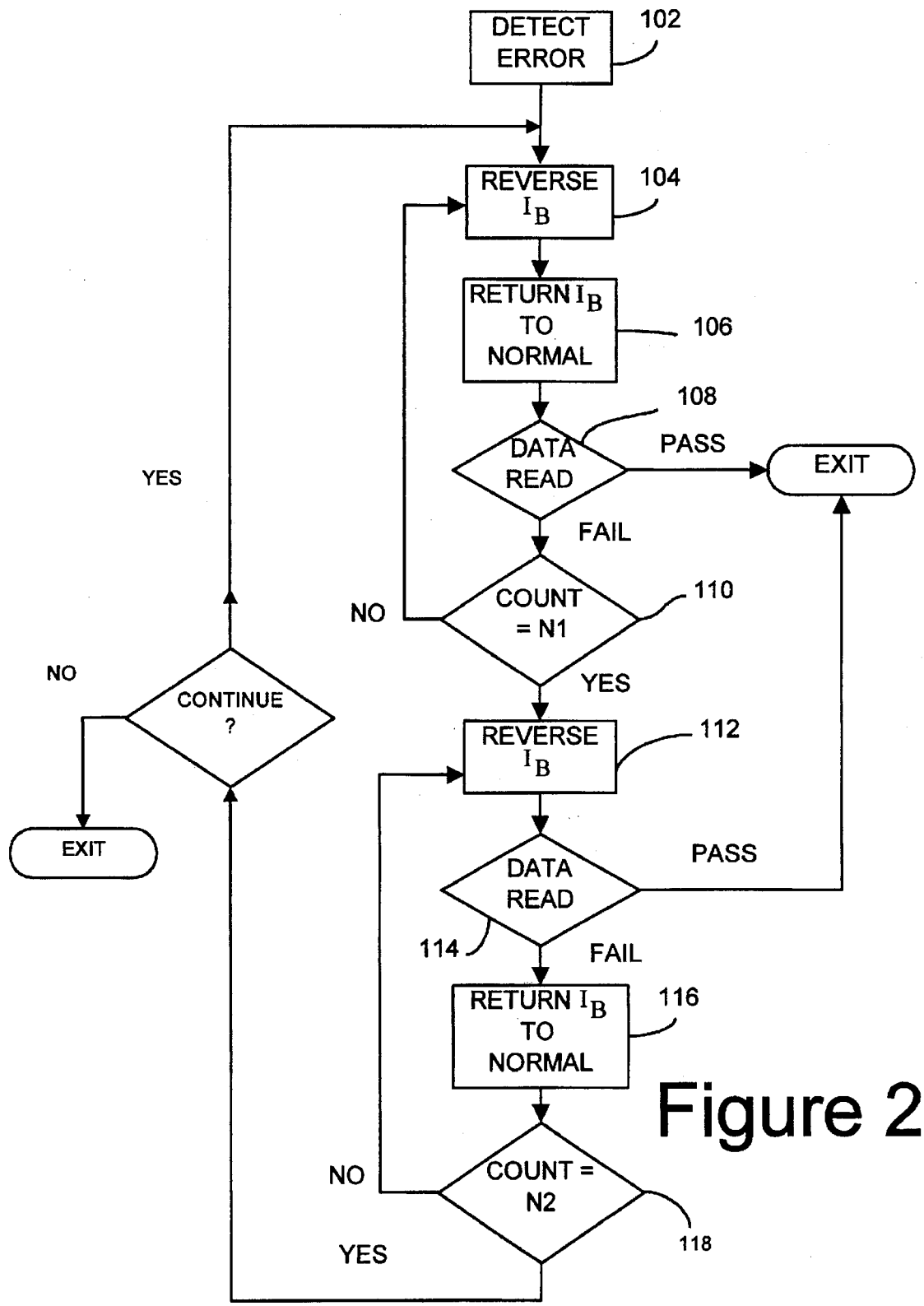
FIG. 2 is a flow chart of a subroutine of a data recovery method in accordance with the present invention.

To more particularly describe the present invention, refer now to FIGS. 1a, 1b and 2. FIG. 1a is a simplified block diagram of a system 10 in accordance with the present invention. In the system 10, the bias current ($I_B$) is provided through a current reversing device 14 to an MR head which are represented as a resistance 16. The device 14 is under control of a microprocessor 18 or the like to provide the reversing capability and other control parameters.

Hence, the only modifications to an existing disk drive is the addition of the current reversing device 14 and a change to the microcode of the microprocessor 18 to provide the current reversing capability. $I_B$ is generated from a current source 12 within an electronic module (not shown) located in the magnetic storage device. The reversing device 14 can similarly be incorporated into the electronic module to provide this additional functionality to the magnetic storage device. The reversing device 14 can be any type of switch, such as a mechanical relay or solid state transistor switch, for example, or the like that reverses the connection of $I_B$ 12 such that the direction of the current $I_B$ in the MR head is reversed.

The magnitude of the current that is reversed need not be equal to the magnitude of the bias current $I_B$ during normal operation, i.e., when the current in the MR head is in a forward or normal direction. Within limits, i.e., the ability of the MR head 16 to carry the current without damage, the greater the reverse current, the stronger the stimulus provided for the MR head to change its amplitude state from low to high. Preferably, the value of the reverse current is within a range of zero to 2 times the nominal bids current $I_B$.

In a preferred embodiment of the present invention wherein the forward bias current $I_B$ was set at 9 milliamps (ma), it was found that reverse current up to 18 ma was effective in changing low amplitude state MR head, to a high amplitude state. In this preferred embodiment, as shown in FIG. 1b, the bias current source 12' comprises a variable current source wherein the magnitude of the $I_B$ is controlled by the controller 18'. Alternatively, the current source 12' can comprise a programmable current source.

In a magnetic storage system, it is desirable to complete error recovery procedures as quickly as possible to allow guide access to the data. Thus, the duration of the current reversal should be as short as possible yet provide a high rate of correction. For example, in a disk drive in which the magnetic disk rotates at 3600 RPM, the time for a complete revolution of the disk is approximately 16 milliseconds (ms). It is also desirable that the error correction procedure be completed within one revolution. In an ideal system, the total duration of the reverse current, the number of cycles times the reverse current duration for each cycle, then, will be less than the time for one revolution of the storage disk, 16 ms, for example.

In a preferred embodiment of the present invention, the time of duration for the reverse current is within a range of 50 nanoseconds (ns) to 500 ms for each cycle of current reversal. The current duration and the number of cycles of current reversal are controlled by the controller 18'.

The minimum duration of the reverse current pulse is a function of several factors: the type of system, rotating disk or magnetic tape, for example, the electronics of the system and the desired level confidences for data recovery, for example. In a rotating disk storage system, for example, a reverse current duration as short as 50 ns may be sufficient to change the MR head state. However, a duration of 1 to 2 ms provides a high confidence level that the data will be recovered and is well within the desired error recovery time limits for a rotating disk storage system. On the other hand, in a magnetic tape system, a reverse current duration of 200 ms is within desired error recovery times.

To more particularly describe the error recovery system in accordance with the present invention, refer now to FIG. 2 which is a flow chart of the operation of the error recovery system 10. In FIG. 2, after other recovery techniques have been unsuccessful, a hard error is detected via step 102 and then $I_B$ is reversed for a predetermined period of time via step 104. Thereafter $I_B$ is returned to its normal state via step 106. Then a data read is attempted via step 108. If the data can be read (PASS) then the routine is exited. If on the other hand, the data still cannot be read (FAIL), then it must be determined if a first predetermined count has been reached via step 110. If the predetermined count has not been reached then steps 104, 106 and 108 are repeated.

If the first predetermined count has been reached then a second portion of the error recovery system 10 is invoked. Accordingly, when the first predetermined count is reached, then $I_B$ is reversed via step 112. The data is then read in the reversed state via step 114. If the data can be read (PASS) then the routine is exited. If, on the other hand, the data cannot be read (FAIL) then it must be determined if a second predetermined count has been reached via step 116. If the second predetermined count has not been reached then return to the normal state, via step 118 and repeat steps 112 and 114. If the second predetermined count has been reached then return to step 104 and repeat the entire error recovery procedure again. As is appreciated by one of ordinary skill in the art, the entire recovery procedure is only repeated a desired number of times until the data is read or the recovery procedure is terminated.

To more clearly show the advantages of the above-identified system 10 a specific embodiment of this technique is described below. When all other error recovery procedures are exhausted, the bias current is reversed for 2 ms, for example, and then switched back to the normal bias current direction. Then an attempt is made to read the data on the disk. If data cannot be read, the above steps are repeated up to one hundred (100) times or more. If data still cannot be read, the bias current is reversed and the data is read with the bias current left in the reverse direction. If data still cannot be read, the bias current is pulsed in the positive direction and then back in the negative direction and then the data is read. The steps are then repeated one hundred (100) times or more. This process has been found to be highly effective in returning a MR head to a stable high amplitude condition.

Accordingly, through the present invention unstable low amplitude magnetoresistive (MR) heads with which data formerly could not be read, now are able to read data. To show specific examples of the advantages of the present invention, refer now to the following discussion and FIGS. 3A–3B, 4A–4C and 5.

Figure 3A:
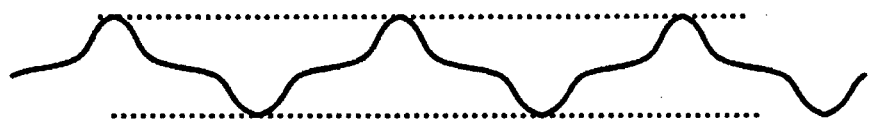
FIGS. 3A and 3B are graphs showing a readback signal from a first amplitude unstable magnetoresistive head (MR) head before and after bias current reversal, respectively.
Figure 3B:
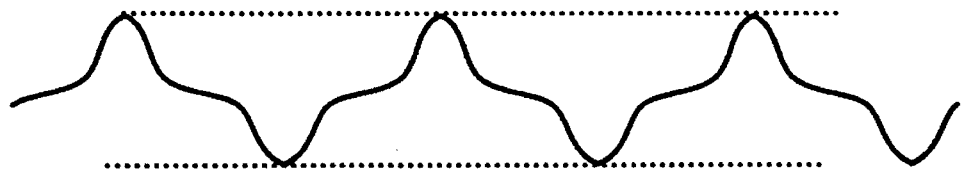
Figure 4A:
FIGS. 4A-4C are graphs showing a readback signal from a second amplitude unstable MR head before, during and after bias current reversal, respectively.
Figure 4B:
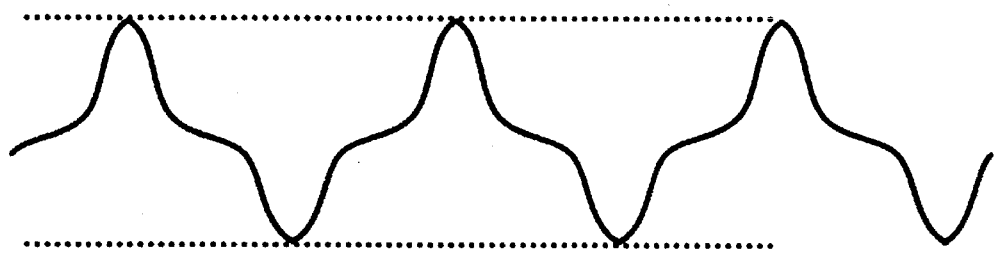
Figure 4C:
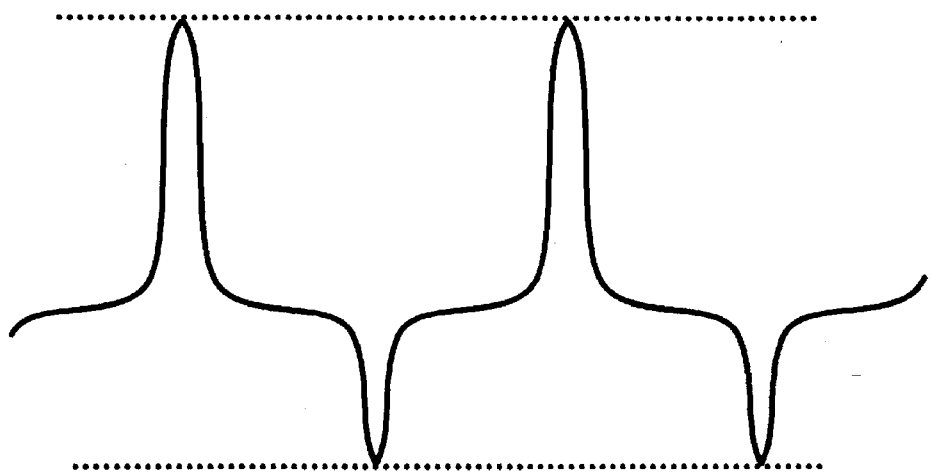

FIGS. 3A and 3B show the readback signal from an amplitude unstable MR head before and after bias current reversal. It has been found, for example, that an amplitude increase of 40% was found after a bias current reversal to −12 mA. FIGS. 4A–4C show the readback signal for another unstable head before (FIG. 4A), during (FIG. 4B) and after (FIG. 4C) a bias current reversal to −12 mA. As is seen, in this embodiment the amplitude increased by 240% after the current reversal (102 Uv before, 350 μV after). Furthermore, it is seen that the head has a normal amplitude in the reversed bias direction.

Figure 5:
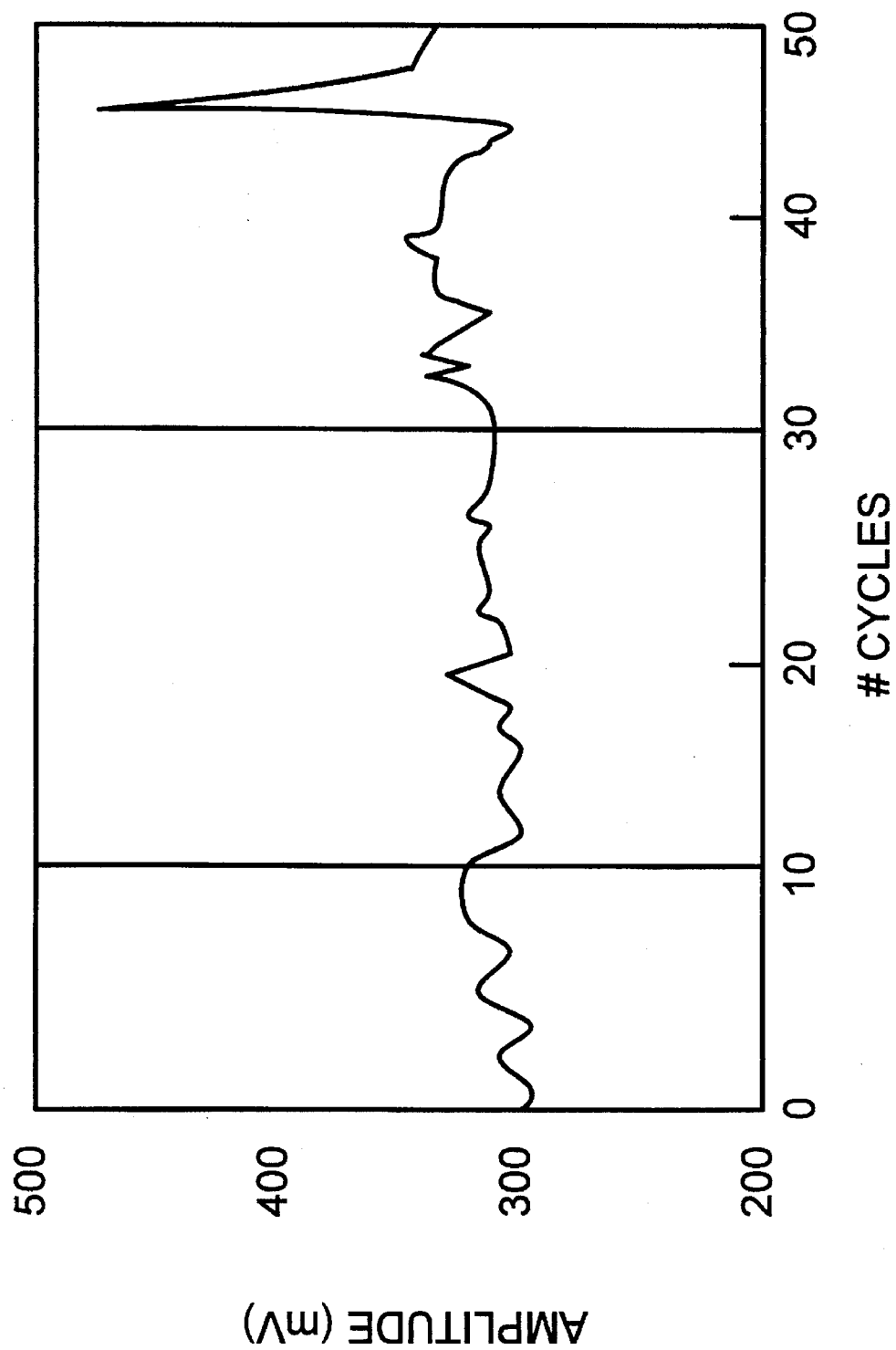
FIG. 5 is a plot of the amplitude of a MR head versus number of current reversal cycles.

FIG. 5 shows a plot of the amplitude for a MR head initially in the low amplitude state for 50 cycles utilizing the system in accordance with the present invention. As is seen, for cycles 1 through 10, the $I_B$ current was kept on and no amplitude change is seen. During cycles 11 through 30, the $I_B$ current was shut off and an inductive write head was used to erase and write the disk. No changes in the signal amplitude were observed for this stress. Finally, during cycles 31 through 50, the bias current was pulsed alternately to −19 mA, then +19 Ma. It is seen at approximately cycle

47 that the head amplitude increased by 55% to the (normal) high amplitude state. Other testing has shown that low amplitude heads that are placed back into the high amplitude state remain there even if the bias current is shut off and turned back on.

In summary, by providing bias current reversal capability within a magnetoresistive read, magnetic storage system and using this capability in conjunction with a error recovery procedure, an improved error recovery system is provided. Hence, bias current reversal can be used to change low amplitude heads back into the high amplitude state. In addition, data can be read from the disk with reversed bias current, since low amplitude heads have been found to exhibit a normal amplitude signal when the current bias is reversed.

It should be understood by one of ordinary skill in the art that the MR head bias current can be reversed any number of times and that use would be within the spirit and scope of the present invention. Similarly, one of ordinary skill in the art will recognize different patterns of current reversal and reading of data, could be utilized and that use would be within the spirit and scope of the present invention. As one example, the current could be reversed and then data could be read from the disk initially in the reversed state and if the data cannot be read after a predetermined number of reversals, then the procedure could be invoked to read the data in the normal state for a predetermined number of reversals. In addition, either reversal procedure (reading data in the normal state or reading data in reverse state) can be utilized and that use would be within the spirit and scope of the present invention.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

We claim:

1. A method of recovering data from a magnetic storage device including magnetic medium for storing data and a magnetoresistive head for reading the data, and including a means for providing a bias current to the magnetoresistive head, the bias current being utilized to provide a signal that allows for the reading of the data, the method including the steps of:

(a) reversing the bias current direction through the magnetoresistive head for a predetermined time period;

(b) returning the bias current to a normal state;

(c) attempting to read the data from the medium;

(d) repeating steps (a–c) a first predetermined number of times when the data cannot be read;

(e) reversing the bias current through the magnetoresistive head when the first predetermined number of times is completed;

(f) attempting to read the data from the medium;

(g) returning the bias current to the normal state;

(h) determining if a second predetermined number of times has been reached when the data cannot be read;

(i) repeating steps (e) (f) and (g) until the second predetermined number of times has been reached; and (j) returning to step (a) a desired number of times.

* * * * *